United States Patent
Watcharotone et al.

(10) Patent No.: US 11,376,106 B2
(45) Date of Patent: Jul. 5, 2022

(54) POWERED TOOTHBRUSH BRISTLE HEAD

(71) Applicant: SUNSTAR AMERICAS, INC., Schaumburg, IL (US)

(72) Inventors: Supinda Watcharotone, Oak Park, IL (US); Toru Saito, Buffalo Grove, IL (US); Jonathan Gum, Wheaton, IL (US)

(73) Assignee: SUNSTAR AMERICAS, INC., Schaumburg, IL (US)

( * ) Notice: Subject to any disclaimer, the term of this patent is extended or adjusted under 35 U.S.C. 154(b) by 0 days.

(21) Appl. No.: 16/172,124

(22) Filed: Oct. 26, 2018

(65) Prior Publication Data

US 2019/0125507 A1    May 2, 2019

Related U.S. Application Data (60) Provisional application No. 62/578,054, filed on Oct. 27, 2017.

(51) Int. Cl.
*A61C 17/22*        (2006.01)
*A46B 9/02*         (2006.01)
(Continued)

(52) U.S. Cl.
CPC ............ *A61C 17/222* (2013.01); *A46B 3/10* (2013.01); *A46B 5/0095* (2013.01); *A46B 7/00* (2013.01);
(Continued)

(58) Field of Classification Search
CPC .......... A46B 13/001; A46B 13/02; A46B 2200/1066; A46B 3/10; A46B 5/0095;
(Continued)

(56) References Cited

U.S. PATENT DOCUMENTS

| 5,652,990 A | 8/1997 | Driesen et al. |
| 5,991,957 A * | 11/1999 | Watanabe ............. A46B 9/045 |
| | | 15/167.1 |

(Continued)

FOREIGN PATENT DOCUMENTS

| CN | 105263360 A | 1/2016 |
| CN | 101773416 B | 5/2016 |

(Continued)

OTHER PUBLICATIONS

JP-2004180712-A—English Machine Translation (Year: 2004).*

(Continued)

*Primary Examiner* — Marc Carlson
(74) *Attorney, Agent, or Firm* — Michael Best & Friedrich LLP (57) ABSTRACT

A powered toothbrush and toothbrush head comprise a transmission housing; a substantially disk-shaped bristle carrier; a plurality of first bristle tufts arranged on the bristle carrier along a first virtual circle; and a plurality of second bristle tufts arranged on the bristle carrier along a second virtual circle, the second virtual circle being concentric with and having a smaller diameter than the first virtual circle, wherein each of the plurality of first bristle tufts includes a plurality of bristles of a first type, having a tapered form.

8 Claims, 4 Drawing Sheets

| Bristle Type | Form | Thickness (mil) | Bristle Height (mm) |
|---|---|---|---|
| A | Tapered | 7 | 8 |
| B | Tapered or End-Rounded | 6-7 | 7-8 |
| C | End-Rounded | 5-6 | 6 |

(51) Int. Cl.
*A46B 9/06* (2006.01)
*A46B 13/00* (2006.01)
*A46B 9/04* (2006.01)
*A46B 7/00* (2006.01)
*A46B 13/02* (2006.01)
*A46B 5/00* (2006.01)
*A46D 1/00* (2006.01)
*A46B 3/10* (2006.01)

(52) U.S. Cl.
CPC ............... *A46B 9/028* (2013.01); *A46B 9/04* (2013.01); *A46B 9/06* (2013.01); *A46B 13/001* (2013.01); *A46B 13/02* (2013.01); *A46D 1/0276* (2013.01); *A46D 1/0284* (2013.01); *A46B 2200/1066* (2013.01)

(58) Field of Classification Search
CPC .. A46B 7/00; A46B 9/028; A46B 9/04; A46B 9/06; A46D 1/0276; A46D 1/0284; A61C 17/222
See application file for complete search history.

(56) References Cited

U.S. PATENT DOCUMENTS

| | | | |
|---|---|---|---|
| 6,021,538 A * | 2/2000 | Kressner | A46B 15/0085 15/28 |
| 6,889,401 B2 | 5/2005 | Fattori et al. | |
| 7,832,042 B2 | 11/2010 | DePuydt et al. | |
| 7,975,343 B2 | 7/2011 | Hohlbein et al. | |
| 8,185,993 B2 * | 5/2012 | Fischer | A46B 9/06 15/28 |
| 8,239,996 B2 * | 8/2012 | Garbers | A46D 1/00 15/167.1 |
| 8,813,292 B2 * | 8/2014 | Driesen | A61C 17/222 15/167.1 |
| 8,813,299 B2 * | 8/2014 | Garbers | A46B 9/025 15/167.1 |
| 9,095,206 B2 | 8/2015 | Varila | |
| 10,004,322 B2 * | 6/2018 | Jungnickel | A46B 9/025 |
| 2004/0107521 A1 * | 6/2004 | Chan | A46B 9/028 15/28 |
| 2006/0096053 A1 | 5/2006 | Franz et al. | |
| 2008/0148502 A1 * | 6/2008 | Fischer | A46B 15/0032 15/22.1 |
| 2009/0255077 A1 * | 10/2009 | Mori | A46D 1/023 15/167.1 |
| 2010/0180392 A1 * | 7/2010 | Binet | A46B 9/028 15/167.1 |
| 2010/0223746 A1 | 9/2010 | Mueller | |
| 2014/0338140 A1 * | 11/2014 | Ji | A46B 9/04 15/167.1 |
| 2014/0359956 A1 * | 12/2014 | Jungnickel | A46B 9/025 15/167.1 |
| 2016/0331113 A1 | 11/2016 | Follows et al. | |
| 2016/0331114 A1 | 11/2016 | Follows et al. | |
| 2016/0331115 A1 | 11/2016 | Follows et al. | |
| 2016/0331116 A1 | 11/2016 | Follows et al. | |
| 2016/0331117 A1 | 11/2016 | Follows et al. | |
| 2017/0251797 A1 * | 9/2017 | Wagstaff | A46B 9/04 |
| 2017/0281323 A1 * | 10/2017 | Fischer | A46B 9/028 |

FOREIGN PATENT DOCUMENTS

| | | |
|---|---|---|
| CN | 105768520 A | 7/2016 |
| DE | 202007017676 U1 | 3/2008 |
| GB | 490892 A | 8/1938 |
| JP | 2004000342 A | 1/2004 |
| JP | 2004180712 A * | 7/2004 |
| KR | 100731939 B1 * | 6/2007 |
| MX | PA06003026 A | 6/2006 |
| WO | 2004000155 A1 | 12/2003 |
| WO | 2016185154 A1 | 11/2016 |

OTHER PUBLICATIONS

Search Report issued from the European Patent Office for related Application No. 18202110.5 dated Feb. 20, 2019 (8 pages).
First Office Action issued by the China National Intellectual Property Administration for Application No. 201811255981.9 dated Apr. 27, 2021 (18 pages including English translation).
Examination Report issued by the European Patent Office for Application No. 18202110.5 dated Jan. 29, 2021 (5 pages).

* cited by examiner

| Bristle Type | Form | Thickness (mil) | Bristle Height (mm) |
|---|---|---|---|
| A | Tapered | 7 | 8 |
| B | Tapered or End-Rounded | 6-7 | 7-8 |
| C | End-Rounded | 5-6 | 6 |

FIG. 3A

| Bristle Type | Form | Thickness (mil) | Bristle Height (mm) |
|---|---|---|---|
| A | Tapered | 7 | 8-10 |
| B' | End-Rounded | 6 | 6-9 |

FIG. 3B

POWERED TOOTHBRUSH BRISTLE HEAD

BACKGROUND

1. Field of the Invention

The present disclosure relates generally to a bristle head for a powered toothbrush. More specifically, the present disclosure relates to a bristle head for a powered toothbrush having both tapered and end-rounded bristles.

2. Description of Related Art

Toothbrushes, including powered toothbrushes, generally include a plurality of bristles to remove dental plaque and clean teeth, including the gaps between neighboring teeth and the gaps between the teeth and gums. During toothbrush manufacture, the bristles are grouped into bristle tufts, bent, and implanted in tuft holes of a head of the toothbrush by an anchor, such as a staple, which is located between the two ends of a bristle. Thus, both ends of each bristle extend away from the surface of the toothbrush head so as to clean teeth during use.

Existing toothbrushes often have difficulty penetrating the gaps between neighboring teeth (interproximal access) and the gaps between the teeth and gums (subgingival access), due at least in part to their bristle arrangement. Accordingly, there exists a need for an improved toothbrush bristle head and bristle arrangement.

BRIEF SUMMARY OF THE INVENTION

Various aspects of the present disclosure relate to a powered toothbrush bristle head with increased interproximal access and subgingival access.

In one exemplary aspect of the present disclosure, a toothbrush head comprises: a transmission housing; a substantially disk-shaped bristle carrier; a plurality of first bristle tufts arranged on the bristle carrier along a first virtual circle; and a plurality of second bristle tufts arranged on the bristle carrier along a second virtual circle, the second virtual circle being concentric with and having a smaller diameter than the first virtual circle, wherein each of the plurality of first bristle tufts includes a plurality of bristles of a first type, having a tapered form.

In another exemplary aspect of the present disclosure, a powered toothbrush comprises: a transmission housing, a substantially disk-shaped bristle carrier, a plurality of first bristle tufts arranged on the bristle carrier along a first virtual circle, and a plurality of second bristle tufts arranged on the bristle carrier along a second virtual circle, the second virtual circle being concentric with and having a smaller diameter than the first virtual circle; and a power handle, wherein each of the plurality of first bristle tufts includes a plurality of bristles of a first type, having a tapered form.

The foregoing summary is intended solely to give a general idea of various aspects of the present disclosure, and does not limit the scope of the disclosure in any way.

DESCRIPTION OF THE DRAWINGS

Detailed and specific features of various embodiments of the present disclosure are more fully disclosed in the following description, reference being had to the accompanying drawings, in which.

DETAILED DESCRIPTION

In the following description, numerous details are set forth. It will be readily apparent to one skilled in the art that these specific details are merely exemplary and not intended to limit the scope of this disclosure.

Figure 1:
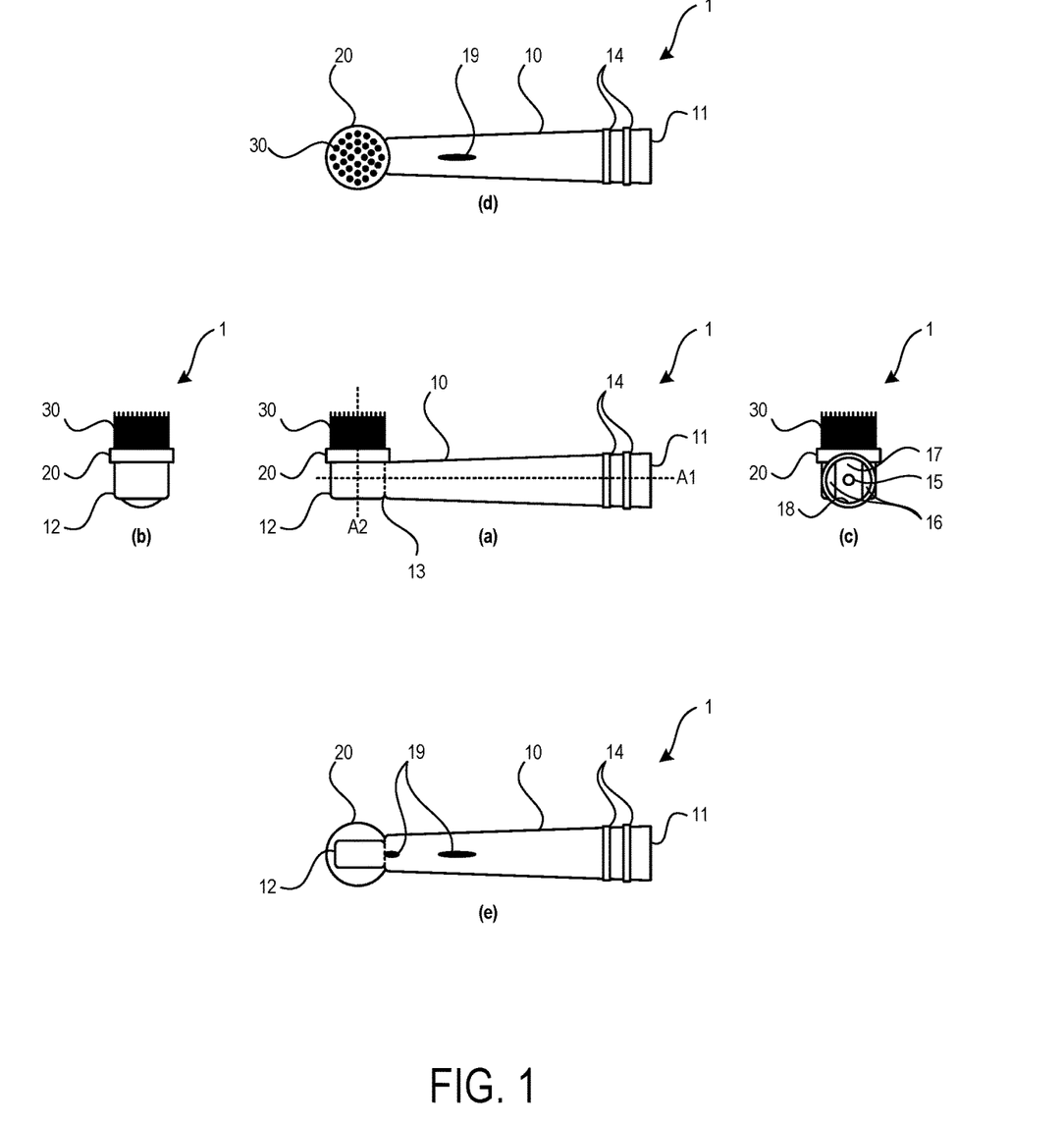
FIG. 1 illustrates several views (a)-(e) of a bristle head according to various aspects of the present disclosure where: view (a) is a front elevation view of bristle head, view (b) is a left side elevation view of bristle head, view (c) is a right side elevation view of bristle head, view (d) is a top plan view of bristle head 1, and view (e) is a bottom plan view of bristle head.

As illustrated in FIG. 1, bristle head 1 comprises a transmission housing 10, a rotating disk 20 as a bristle carrier, and a plurality of bristle tufts 30. Transmission housing 10 extends longitudinally from a handle end 11 to a head end 12, with an inflection surface 13 therebetween. Handle end 11 is configured to connect to a power handle 2 (see FIG. 2). Head end 12 is configured to support rotating disk 20. Between handle end 11 and inflection surface 13, transmission housing 10 has a generally frustoconical shape with axis A1 as the central axis such that the transmission housing 10 tapers from handle end 11 toward inflection surface 13, with handle end 11 having a larger cross-sectional area than inflection surface 13. Proximate to handle end 11, transmission housing 10 includes one or more (as illustrated, two) circumferential ridges 14, which may act as a grip to assist in attaching transmission housing 10 to the power handle. Between head end 12 and inflection surface 13, transmission housing 10 has a generally cylindrical shape with axis A2 as the central axis. Axis A2 also forms the central axis of rotating disk 20, and axes A1 and A2 are perpendicular to one another. As illustrated in FIG. 1 at view (e), the transmission housing 10 adjacent rotating disk 20 has a cross-sectional shape that is a rounded rectangle; however, the cross-sectional shape may alternatively be a circle, an ellipse, a polyhedron, or any other shape. Preferably, any corners of transmission housing 10 are rounded to reduce user discomfort.

As illustrated in FIG. 1 at view (c), transmission housing 10 includes an internal cavity 17 defined by an interior wall 18 of transmission housing 10. Cavity 17 is dimensioned to connect to the power handle. The transmission housing 10 is configured to translate motion caused by the power handle to rotating disk 20. Proximate to handle end 11, interior wall 18 of transmission housing 10 includes a pair of opposing flanged surfaces 16. Flanged surfaces 16 are dimensioned to provide a friction fit with the power handle, and may have a roughened texture to increase the strength of the friction fit. Distal to handle end 11, interior wall 18 of transmission housing 10 defines a cylindrical bore 15 running longitudinally therethrough and between flanged surfaces 16. Cylindrical bore 15 is dimensioned to receive a transmission shaft of the power handle so as to allow the transmission shaft to rotationally oscillate freely therein. Cylindrical bore 15 also houses a rod (not shown) to translate a rotation of the transmission shaft into a rotation of rotating disk 20. This may be accomplished for example, by a bend in the rod cooperating with rotating disk 20, by a right angle gear, and the like.

Transmission housing 10 may be formed of a unitary construction, such as by molding. Alternatively, flanged surfaces 16 and/or cylindrical bore 15 may be in a modular insert which is provided in cavity 17. As illustrated in FIG. 1 at views (d) and (e), transmission housing 10 includes one or more openings 19 to prevent dust or other particulate matter from accumulating in cavity 17 by creating a path by which such debris can exit the cavity.

Rotating disk 20 is rotatably mounted on transmission housing 10, and is configured to oscillate about axis A2 in synchronization with an oscillation of the transmission shaft of the power handle. Rotating disk 20 is substantially cylindrical (that is, "disk-shaped"), and includes a substantially flat upper surface 21 (see FIG. 2) configured to receive bristle tufts 30.

Figure 2:
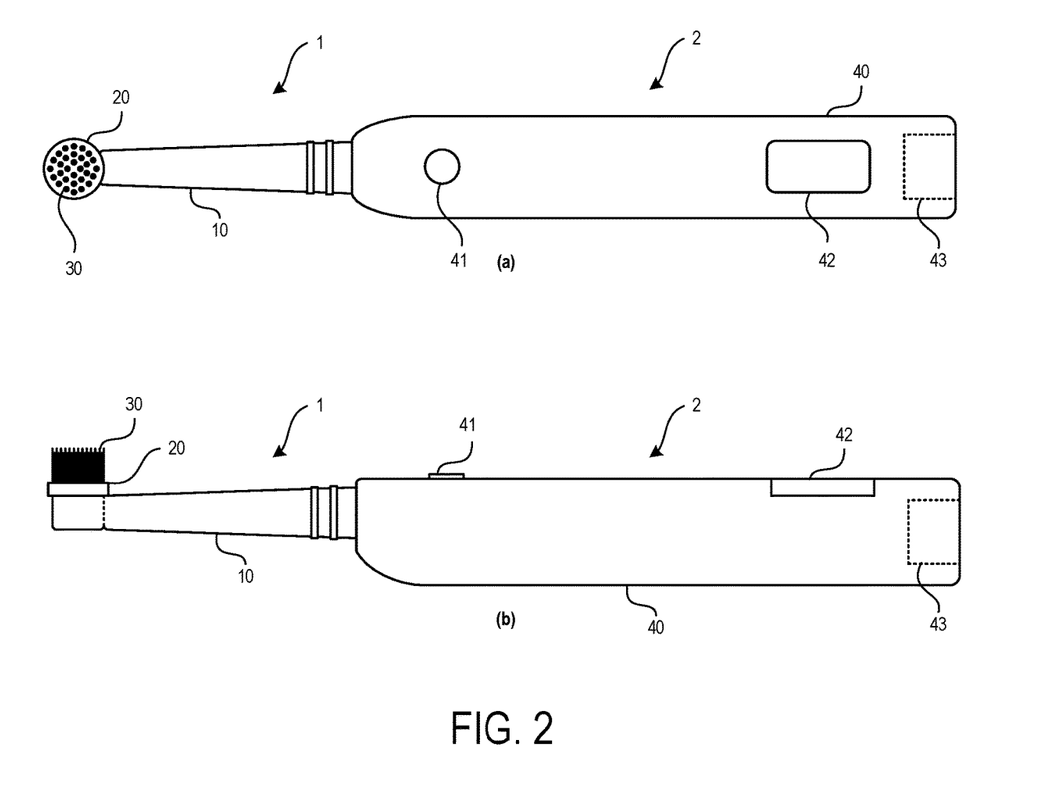
FIG. 2 illustrates several views (a)-(b) of a toothbrush according to various aspects of the present disclosure where: view (a) is a top plan view of the toothbrush, and view (b) is a front elevation view of the toothbrush.

FIG. 2 illustrates an assembled powered toothbrush including bristle head 1 and power handle 2. As illustrated, power handle 2 includes: a power button 41; an indicator section 42 which may include LEDs, an LCD, and the like; and a charging port 43. Charging port 43 may be dimensioned to receive an adapter or a portion of an induction charging stand so as to receive power and charge an internal battery. Alternatively, charging port 43 may not be present and the power handle 2 may instead include a removable battery.

Figure 3A:
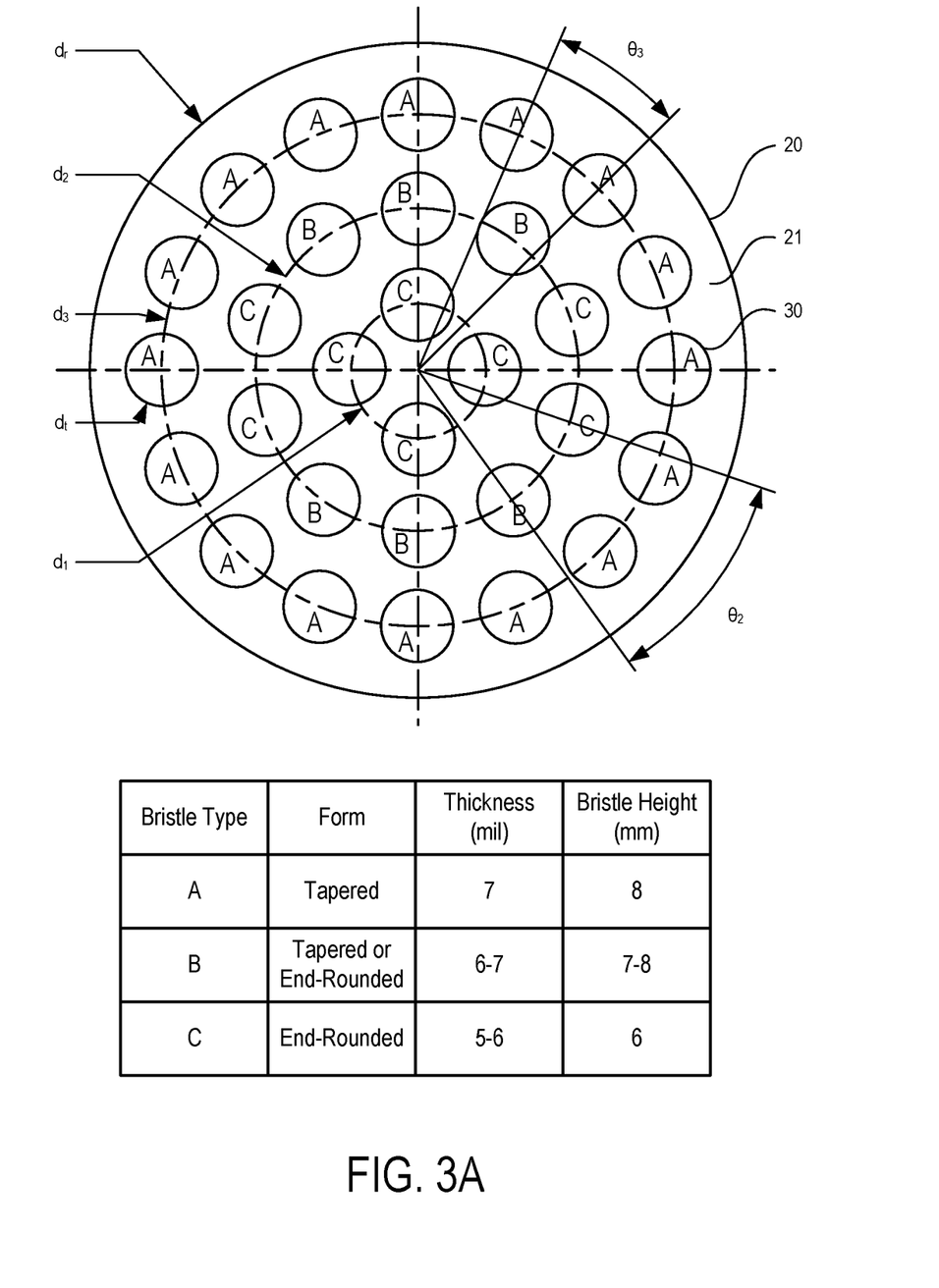
FIGS. 3A-B respectively illustrate bristle arrangements for the exemplary bristle head of FIG. 1 in a top plan view.
Figure 3B:
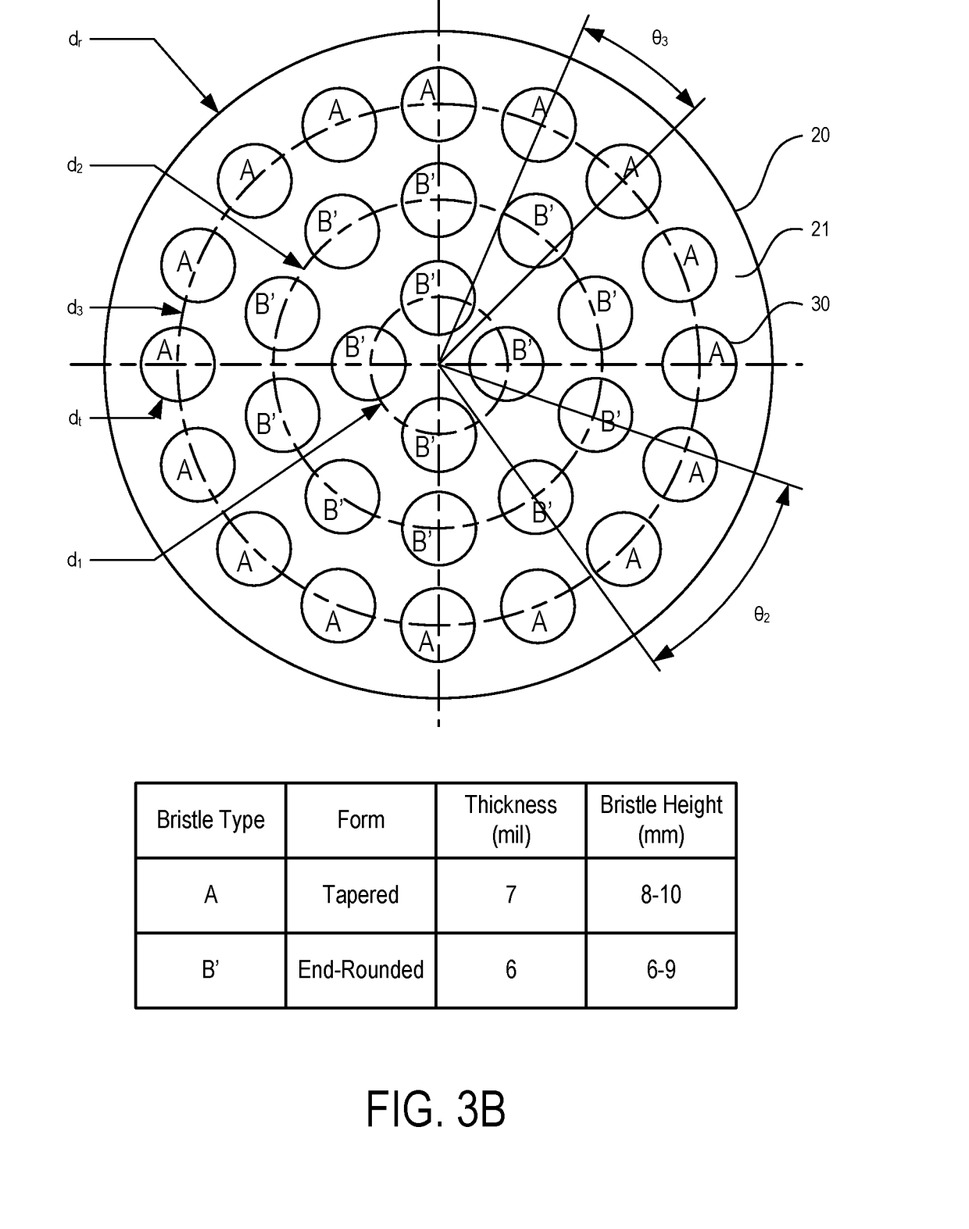

FIGS. 3A-B respectively provide more detailed illustrations of rotating disk 20. As illustrated in FIG. 3A, bristle tufts 30 are categorized according to three types: A, B, and C. A particular "type" denotes a set of physical parameters or characteristics, including: a form and material of the bristle, a thickness of the bristle, and a height to which the bristle extends relative to the upper surface 21. Each bristle tuft 30 includes a plurality of bristles of a single category. Each bristle is attached to the rotating disk 20 at an intermediate point between the ends of the bristle. Thus, each end of the bristle extends from upper surface 21. The intermediate point may be located approximately at the midpoint of the bristle, in which case both ends of the bristle extend the same distance from the upper surface 21 (a "U-hook" configuration), or may be located closer to an end of the bristle, in which case one end of the bristle extends from the upper surface 21 by to a greater height than the other end of the bristle (a "J-hook" configuration).

As illustrated in FIGS. 3A-B, bristle tufts 30 are arranged along three concentric virtual circles, having respective diameters d1, d2, and d3, so that one of the virtual circles passes through a center of each bristle tuft 30. Rotating disk 20 has a diameter dr, and each bristle tuft 30 has a diameter dt. Along each virtual circle, bristle tufts 30 are disposed at regular angular intervals. As particularly illustrated, four bristle tufts 30 exist along the inner virtual circle such that their centers are disposed at approximate intervals θ1 of 90°; ten bristle tufts 30 exist along the intermediate virtual circle such that their centers are disposed at approximate intervals θ2 of 36°; and sixteen bristle tufts 30 exist along the outer virtual circle such that their centers are disposed at approximate intervals θ3 of 22.5°. Generally, rotating disk 20 is configured to oscillate to a maximum rotational displacement of 36° in either direction; however, bristle tufts 30 according to the present disclosure may be used with any type of rotating disk 20, including one which oscillates to a maximum rotational displacement of greater than or less than 36°, or one which rotates continuously in the same direction.

Each bristle of type A, B, and C extends a respective height $h_a$, $h_b$, and $h_c$ from upper surface 21, and includes bristles of a particular form and material. The "form" of a bristle refers to the cross-sectional shape of the bristle along a longitudinal axis thereof. Here, each bristle has either a tapered form or an end-rounded form.

A bristle has a "tapered" form when the diameter of the bristle distal to the upper surface 21 is smaller than the diameter of the bristle proximate to the upper surface 21. In this manner, the bristle appears pointed or tapered in cross-section. A bristle may be formed into a tapered shape by subjecting an unshaped bristle to, for example, a chemical process.

A bristle has an "end-rounded" form when the diameter of the bristle remains substantially constant across most of its length, but where the end distal to the upper surface 21 has rounded corners when viewed in cross-section. A bristle may be end-rounded to such a degree that the tip has a hemispherical shape. A bristle may be formed into an end-rounded shape by subjecting an unshaped bristle to, for example, a mechanical process such as polishing.

Where a bristle has a tapered form, it may be formed of any material capable of being mechanically or chemically tapered. In one example, it is formed of polybutylene terephthalate (PBT). Where a bristle has an end-rounded form, it may be formed of any material capable of being subject to an end-rounding process. In one example, it is formed of nylon; e.g., nylon 612.

Examples

In a first aspect of the present disclosure, illustrated in FIG. 3A, types A, B, and C of bristle tufts 30 are different from each other. In this aspect, the type A bristle tufts have bristles with a tapered form and the types B and C bristle tufts may have bristles with either a tapered form or an end-rounded form. In this configuration, the bristles in the type A bristle tufts may be the same height as or taller than the bristles in the type B bristle tufts, which may in turn be taller than the bristles in the type C bristle tufts.

To illustrate this aspect, several examples were created. Table 1 below describes dimensions common to each of the several examples of bristle head 1.

TABLE 1

| Feature | Dimension (mm) |
| --- | --- |
| distance from handle end to inflection surface | 59 |
| distance from head end to inflection surface | 12 |
| diameter of transmission housing at handle end | 12 |
| diameter of transmission housing at inflection surface | 6 |
| height of head end | 8 |
| distance from handle end to first circumferential ridge | 4.5 |
| distance from first circumferential ridge to second circumferential ridge | 3 |
| width of circumferential ridge | 1.5 |
| height of rotating disk | 3 |
| diameter of rotating disk | 14.6 |
| diameter of bristle tufts | 1.6 |

The produced examples of bristle head 1 differ from one another in the dimensions and combination of types A, B, and C of bristle tufts 30. These dimensions are summarized in Table 2 below.

TABLE 2

| Example | Type | Form | Bristle Thickness (mil) | Bristle Height (mm) |
|---|---|---|---|---|
| Example 1 | A | Tapered | 7 | 8 |
| | B | End-Rounded | 6 | 7 |
| | C | End-Rounded | 6 | 6 |
| Example 2 | A | Tapered | 7 | 8 |
| | B | End-Rounded | 6 | 7 |
| | C | End-Rounded | 5 | 6 |
| Example 3 | A | Tapered | 7 | 8 |
| | B | Tapered | 7 | 8 |
| | C | End-Rounded | 6 | 6 |
| Example 4 | A | Tapered | 7 | 8 |
| | B | Tapered | 7 | 8 |
| | C | End-Rounded | 5 | 6 |

In Table 2, the bristle height may have a manufacturing tolerance of ±1 mm for PBT, or smaller for nylon. Each of the produced examples was evaluated against a Comparative Example, which is a manual toothbrush without the bristle head as described herein. In evaluating the examples, testing was performed to determine the ability of each example to remove artificial plaque deposits from under the gingival margin and between simulated teeth. These abilities are measured by subgingival access efficacy (SAE) and interproximal access efficacy (IAE), respectively.

In determining SAE, twenty-four tests were performed on each example, attached to a power handle where appropriate. The tests were performed to evaluate the ability of toothbrush bristles to penetrate below simulated gingival tissues around posterior tooth shapes, and to remove artificial plaque, using horizontal brushing motions. SAE is here defined as the maximum depth of the plaque deposit removed, in mm. The testing results are presented in Table 3 below.

TABLE 3

| Example | SAE Mean (SD) |
|---|---|
| Example 1 | 1.23 (0.26) |
| Example 2 | 1.51 (0.30) |
| Example 3 | 1.40 (0.22) |
| Example 4 | 1.22 (0.27) |
| Comparative Example | 0.02 (0.07) |

In determining IAE, twenty-four tests were performed on each example, attached to a power handle where appropriate. The tests were performed to evaluate the ability of toothbrush bristles to penetrate between simulated teeth and remove simulated plaque deposits, using both horizontal and vertical brushing motions. Tests were performed both for simulated anterior teeth and simulated posterior teeth. IAE is here defined as the maximum width of the plaque deposit removed, in cm. The testing results are presented in Tables 4-6 below, where Table 4 presents results for vertical brushing motions, Table 5 presents results for horizontal brushing motions, and Table 6 presents overall results.

TABLE 4

| | IAE Mean, vertical stroke (SD) | |
|---|---|---|
| Example | Anterior Teeth | Posterior Teeth |
| Example 1 | 1.12 (0.06) | 1.15 (0.06) |
| Example 2 | 1.20 (0.04) | 1.29 (0.07) |
| Example 3 | 1.27 (0.05) | 1.19 (0.03) |
| Example 4 | 1.24 (0.05) | 1.15 (0.04) |
| Comparative Example | 0.96 (0.03) | 1.17 (0.03) |

TABLE 5

| | IAE Mean, horizontal stroke (SD) | |
|---|---|---|
| Example | Anterior Teeth | Posterior Teeth |
| Example 1 | 1.05 (0.06) | 1.12 (0.12) |
| Example 2 | 1.01 (0.03) | 1.07 (0.05) |
| Example 3 | 1.02 (0.03) | 1.03 (0.05) |
| Example 4 | 1.07 (0.03) | 1.04 (0.04) |
| Comparative Example | 0.78 (0.04) | 1.01 (0.10) |

TABLE 6

| Example | IAE Mean, overall (SD) |
|---|---|
| Example 1 | 1.11 (0.09) |
| Example 2 | 1.14 (0.12) |
| Example 3 | 1.13 (0.11) |
| Example 4 | 1.12 (0.09) |
| Comparative Example | 0.98 (0.15) |

As can be seen from the above test results, each of Examples 1-4 exhibit superior IAE and SAE to the Comparative Example.

In a second aspect of the present disclosure, illustrated in FIG. 3B, the type B bristle tufts and type C bristle tufts of FIG. 3A are the same and referred to as type B' bristle tufts. In this aspect, the type A bristle tufts have bristles with a tapered form and the type B' bristle tufts may have bristles with either a tapered form or an end-rounded form. In this configuration, the bristles in the type A bristle tufts may be the same height as, taller than, or shorter than the bristles in the type B' bristle tufts.

To illustrate this aspect, several examples were created. The dimensions of the types of bristle tufts are summarized in Table 7 below.

TABLE 7

| Example | Type | Form | Bristle Thickness (mil) | Bristle Height (mm) |
|---|---|---|---|---|
| Example 5 | A | Tapered | 7 | 8 |
| | B' | End-Rounded | 6 | 6 |
| Example 6 | A | Tapered | 7 | 8 |
| | B' | End-Rounded | 6 | 7 |
| Example 7 | A | Tapered | 7 | 9 |
| | B' | End-Rounded | 6 | 7 |
| Example 8 | A | Tapered | 7 | 10 |
| | B' | End-Rounded | 6 | 7 |
| Example 9 | A | Tapered | 7 | 9 |
| | B' | End-Rounded | 6 | 8 |
| Example 10 | A | Tapered | 7 | 10 |
| | B' | End-Rounded | 6 | 8 |
| Example 11 | A | Tapered | 7 | 10 |
| | B' | End-Rounded | 6 | 9 |

In Table 7, the bristle height may have a manufacturing tolerance of ±1 mm for PBT, or smaller for nylon.

In a third aspect of the present disclosure, the type A bristle tufts and type B bristle tufts are the same. In this aspect, the type A and B bristle tufts have bristles with a tapered form and the type C bristle tufts may have bristles with either a tapered form or an end-rounded form. In this configuration, the bristles in the types A and B bristle tufts may be the same height as, taller than, or shorter than the bristles in the type C bristle tufts.

CONCLUSION

The powered toothbrush bristle head as described in the foregoing disclosure may be embodied in any one or more of the following configurations:

(1) A toothbrush head, comprising: a transmission housing; a substantially disk-shaped bristle carrier; a plurality of first bristle tufts arranged on the bristle carrier along a first virtual circle; and a plurality of second bristle tufts arranged on the bristle carrier along a second virtual circle, the second virtual circle being concentric with and having a smaller diameter than the first virtual circle, wherein each of the plurality of first bristle tufts includes a plurality of bristles of a first type, having a tapered form.

(2) The toothbrush head according to (1), wherein a first subset of the plurality of second bristle tufts includes a plurality of bristles of a second type, having an end-rounded form.

(3) The toothbrush head according to (1) or (2), wherein a height of the plurality of bristles of the first type is greater than a height of the plurality of bristles of the second type.

(4) The toothbrush head according to any one of (1) to (3), wherein a second subset of the plurality of second bristle tufts includes a plurality of bristles of a third type.

(5) The toothbrush head according to (4), wherein the third type is the same as the first type.

(6) The toothbrush head according to (4) or (5), wherein the plurality of bristles of the third type have an end-rounded form, and a height of the plurality of bristles of the third type is greater than a height of the plurality of bristles of the second type, and less than a height of the plurality of bristles of the third type.

(7) The toothbrush head according to any one of (1) to (6), further comprising a plurality of third bristle tufts arranged on the bristle carrier along a third virtual circle, the third virtual circle being concentric with and having a smaller diameter than the second virtual circle.

(8) The toothbrush head according to (7), wherein each of the plurality of third bristle tufts includes a plurality of bristles of the second type.

(9) The toothbrush head according to any one of (1) to (8), wherein the plurality of bristles of the second type are formed of a nylon.

(10) The toothbrush head according to any one of (1) to (9), wherein the plurality of bristles of the first type are formed of polybutylene terephthalate.

(11) A powered toothbrush, comprising: a toothbrush head including: a transmission housing, a substantially disk-shaped bristle carrier, a plurality of first bristle tufts arranged on the bristle carrier along a first virtual circle, and a plurality of second bristle tufts arranged on the bristle carrier along a second virtual circle, the second virtual circle being concentric with and having a smaller diameter than the first virtual circle; and a power handle, wherein each of the plurality of first bristle tufts includes a plurality of bristles of a first type, having a tapered form.

(12) The powered toothbrush according to (11), wherein a first subset of the plurality of second bristle tufts includes a plurality of bristles of a second type, having an end-rounded form.

(13) The powered toothbrush according to (11) or (12), wherein a height of the plurality of bristles of the first type is greater than a height of the plurality of bristles of the second type.

(14) The powered toothbrush according to any one of (11) to (13), wherein a second subset of the plurality of second bristle tufts includes a plurality of bristles of a third type.

(15) The powered toothbrush according to (14), wherein the third type is the same as the first type.

(16) The powered toothbrush according to (14) or (15), wherein the plurality of bristles of the third type have an end-rounded form, and a height of the plurality of bristles of the third type is greater than a height of the plurality of bristles of the second type, and less than a height of the plurality of bristles of the third type.

(17) The powered toothbrush according to any one of (11) to (16), further comprising a plurality of third bristle tufts arranged on the bristle carrier along a third virtual circle, the third virtual circle being concentric with and having a smaller diameter than the second virtual circle.

(18) The powered toothbrush according to (17), wherein each of the plurality of third bristle tufts includes a plurality of bristles of the second type.

(19) The powered toothbrush according to any one of (11) to (18), wherein the plurality of bristles of the second type are formed of a nylon.

(20) The powered toothbrush according to any one of (11) to (19), wherein the plurality of bristles of the first type are formed of polybutylene terephthalate.

With regard to the processes, systems, methods, heuristics, etc. described herein, it should be understood that the above description is intended to be illustrative and not restrictive. Embodiments and applications other than the examples provided would be apparent upon reading the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

What is claimed is:

1. A toothbrush head, comprising:
   a transmission housing;
   a substantially disk-shaped bristle carrier;
   a plurality of first bristle tufts arranged on the bristle carrier along a first virtual circle;
   a plurality of second bristle tufts arranged on the bristle carrier along a second virtual circle, the second virtual circle being concentric with and having a smaller diameter than the first virtual circle, and
   a plurality of third bristle tufts arranged on the bristle carrier along a third virtual circle, the third virtual circle being concentric with and having a smaller diameter than the second virtual circle, wherein
   each of a pair of adjacent first bristle tufts of the plurality of first bristle tufts includes a plurality of bristles of a first type, each of the plurality of bristles of the first type having a tapered form,
   a first subset of the plurality of second bristle tufts includes a plurality of bristles of a second type, each of the plurality of bristles of the second type having a distal end with rounded corners, from a cross-section perspective,
   a second subset of the plurality of second bristle tufts includes a plurality of bristles of a third type, a second type bristle height is less than a first type bristle height and a third type bristle height, and a second type bristle thickness is less than a first type bristle thickness and less than a third type bristle thickness, each of the plurality of third bristle tufts includes a plurality of bristles of the second type, and each of the first type bristle height, second type bristle height, and third type bristle height is no greater than 8 mm.

2. The toothbrush head according to claim 1, wherein the third type is the same as the first type.

3. The toothbrush head according to claim 1, wherein
the plurality of bristles of the third type have an end-rounded form, and
the third type bristle height is less than the first type bristle height.

4. The toothbrush head according to claim 1, wherein the plurality of bristles of the second type are formed of a nylon.

5. The toothbrush head according to claim 1, wherein the plurality of bristles of the first type are formed of polybutylene terephthalate.

6. A powered toothbrush comprising:
a toothbrush head including:
a transmission housing,
a substantially disk-shaped bristle carrier,
a plurality of first bristle tufts arranged on the bristle carrier along a first virtual circle,
a plurality of second bristle tufts arranged on the bristle carrier along a second virtual circle, the second virtual circle being concentric with and having a smaller diameter than the first virtual circle, and
a plurality of third bristle tufts arranged on the bristle carrier along a third virtual circle, the third virtual circle being concentric with and having a smaller diameter than the second virtual circle; and
a power handle,
wherein:
each of a pair of adjacent first bristle tufts of the plurality of first bristle tufts includes a plurality of bristles of a first type, each of the plurality of bristles having a tapered form,
a first subset of the plurality of second bristle tufts includes a plurality of bristles of a second type, each of the plurality of bristles of the second type having a distal end with rounded corners, from a cross-section perspective,
a second subset of the plurality of second bristle tufts includes a plurality of bristles of the first type,
a second type bristle height is less than a first type bristle height, and the second type bristle thickness is less than a first type bristle thickness,
each of the plurality of third bristle tufts includes a plurality of bristles of the second type, and
each of the first type bristle height and the second type bristle height is no greater than 8 mm.

7. The powered toothbrush according to claim 6, wherein the plurality of bristles of the second type are formed of a nylon.

8. The powered toothbrush according to claim 6, wherein the plurality of bristles of the first type are formed of polybutylene terephthalate.

* * * * *